United States Patent
Hunt et al.

(12)

(10) Patent No.: US 6,377,662 B1
(45) Date of Patent: Apr. 23, 2002

(54) SPEECH-RESPONSIVE VOICE MESSAGING SYSTEM AND METHOD

(75) Inventors: Peter Hunt, Scotts Valley; Susannah Albright, Menlo Park; Kamil Grajski, San Jose; Leonardo Rub, Sunnyvale, all of CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/503,409

(22) Filed: Feb. 14, 2000

Related U.S. Application Data

(62) Division of application No. 08/822,034, filed on Mar. 24, 1997, now Pat. No. 6,094,476.

(51) Int. Cl.[7] .............................................. H04M 3/487
(52) U.S. Cl. ..................................... 379/88.01; 704/275
(58) Field of Search ........................... 379/88.01, 88.02, 379/88.03, 88.04; 704/200, 201, 231, 251, 270, 275

(56) References Cited

U.S. PATENT DOCUMENTS

| | | | |
|---|---|---|---|
| 4,761,807 A | 8/1988 | Matthews et al. ............ 379/89 |
| 5,226,090 A | 7/1993 | Kimura ....................... 381/110 |
| 5,406,618 A | 4/1995 | Knuth et al. .................. 379/67 |
| 5,583,919 A | 12/1996 | Talvard et al. ................ 379/67 |
| 5,602,963 A | 2/1997 | Bissonnette et al. ....... 395/2.84 |
| 5,684,869 A | 11/1997 | Palumbo et al. ............ 379/182 |
| 5,719,921 A | 2/1998 | Vysotsky et al. ............. 379/88 |

FOREIGN PATENT DOCUMENTS

| | | | |
|---|---|---|---|
| EP | 0 651 372 A2 | 5/1995 | ............. G10L/5/06 |
| EP | 0 736 995 A2 | 10/1996 | ............. H04M/3/50 |
| WO | WO 93 13518 A | 7/1993 | ............. G10L/5/06 |
| WO | WO 93 26113 A | 12/1993 | ............. H04M/3/50 |

OTHER PUBLICATIONS

"Stimultaneous Use of Dual Tone Multi–Frequency and Voice Recognition in Voice Responsive Unit Applications", *IBM Technical Disclosure Bulletin*, vol. 39, No. 3 (Mar. 1996), pp. 31–32.

B. Mazor et al., "The Design of Speech–Interactive Dialogs for Transaction–Automation Systems", *Speech Communication*, vol. 17, No. 3/04 (Nov. 1995), pp. 313–320.

C. Chan et al., "Design Considerations in the Selection of an Automatic Speech Recognition System for the Quality Control Inspection Function", IEEE Global Telecommunications Conference, GLOBECOM '84 Conference Record, vol. 1, (Nov. 1984), pp. 273–276.

*Primary Examiner*—Scott L. Weaver
(74) *Attorney, Agent, or Firm*—Haverstock & Owens LLP

(57) ABSTRACT

A system and method for speech-responsive voice messaging, in which a Speech-Responsive Voice Messaging System (SRVMS) preferably provides a hierarchically-simple speech user interface (UI) that enables subscribers to use speech to specify commands such as mailboxes, passwords, and digits. The SRVMS generates and evaluates candidate results. The SRVMS invokes a speech UI navigation operation or a voice messaging operation according to the outcome of the evaluation of the candidate results. In the preferred embodiment, the SRVMS determines whether the candidate results are good, questionable, or bad; and whether two or more candidate results are ambiguous due to a likelihood that each such result could be a valid command. If the candidate results are questionable or ambiguous, an ambiguity resolution UI prompts the subscriber to confirm whether the best candidate result is what the subscriber intended. In response to repeated speech recognition failures, the SRVMS transfers the subscriber to a Dual Tone Multi Frequency (DTMF) UI. Transfer to the DTMF UI is also performed in response to detection of predetermined DTMF signals issued by the subscriber while the speech UI is in context. The SRVMS provides a logging unit and a reporting unit which operate in parallel with the speech UI, in a manner that is transparent to subscribers. The logging unit directs the selective logging of subscriber utterances, and the reporting unit selectively generates and maintains system performance statistics on multiple detail levels.

28 Claims, 10 Drawing Sheets

SPEECH-RESPONSIVE VOICE MESSAGING SYSTEM AND METHOD

This is a division of U.S. patent application Ser. No. 08/822,034, filed Mar. 24, 1997, now U.S. Pat. No. 6,094,476, the contents of which are hereby incorporated by reference.

BACKGROUND OF THE INVENTION

1.1 Field of the Invention

The present invention relates to systems and methods for both voice messaging and speech recognition. More particularly, the present invention is a voice messaging system and method responsive to speech commands issued by a voice messaging subscriber.

1.2 Description of the Background Art

Voice messaging systems have become well-known in recent years. A typical Voice Messaging System (VMS) interacts with a subscriber through a Dual-Tone Multi-Frequency (DTMF), or touchtone, voice messaging User Interface (UI). During subscriber interactions, the VMS issues a voice prompt requesting the subscriber to press one or more DTMF keys to initiate corresponding operations. In the event that the subscriber presses a valid DTMF key sequence, the VMS performs a particular set of operations.

Under certain circumstances, it may be inconvenient or even dangerous for a subscriber to focus their attention on a keypad. For example, in a wireless telephone environment where a subscriber is driving or walking while on the telephone, requiring the subscriber to select an option from a set of DTMF keys could result in an accident or difficult situation. As a result, systems and methods have been developed for using speech as a means for providing hands-free interaction with a VMS, through speech-based selection of commands, user interface navigation, and entry of digits and/or digit strings.

Those skilled in the art will recognize that a conventional DTMF voice messaging UI usually has a fairly complex or extensive hierarchy of menus. Some systems that provide speech-based VMS interaction simply implement a speech UI having an identical or essentially identical menu hierarchy as a conventional DTMF UI. When a subscriber must concurrently perform multiple tasks, such as driving and VMS interaction, reducing the complexity of lower-priority tasks is very important. Thus, systems that implement a speech UI in this manner are undesirable because they fail to reduce VMS interaction complexity.

Those skilled in the art will recognize that speech recognition is an inexact technology. In contrast to DTMF signals, speech is uncontrolled and highly variable. The difficulty of recognizing speech in telephone environments is increased because telephone environments are characterized by narrow bandwidth, multiple stages of signal processing or transformation, and considerable noise levels. Wireless telephone environments in particular tend to be noisy due to high levels of background sound arising from, for example, a car engine, nearby traffic, or voices within a crowd.

To facilitate the successful determination of a subscriber's intentions, speech-based voice messaging systems must provide a high level of error prevention and tolerance, and significantly reduce the likelihood of initiating an unintended operation. Speech-based voice messaging systems should also provide a way for subscribers to successfully complete a set of desired voice messaging tasks in the event that repeated speech recognition failures are likely. Prior art speech-based voice messaging systems are inadequate in each of these respects.

The difficulties associated with successfully recognizing subscribers' speech and determining their intentions necessitates a high level of support and maintenance to achieve optimal system performance. The availability of particular speech recognition data and system performance measures can be very useful in this regard, especially for system testing and problem analysis. Prior art systems and methods fail to provide an adequate means for flexibly controlling when and how speech recognition data and system performance measures are stored and/or generated. Moreover, prior art systems and methods fail to collect maximally useful speech recognition data, namely, the speech data generated during actual in-field system use. What is needed is a speech-responsive voice messaging system and method that overcomes the shortcomings in the prior art.

SUMMARY OF THE INVENTION

The present invention is a system and method for speech-responsive voice messaging, in which a Speech-Responsive VMS (SRVMS) preferably provides a hierarchically-simple speech UI that enables subscribers to specify mailboxes, passwords, digits, and/or digit strings. In the SRVMS, a recognition command generator and a speech and logging supervisor control the operation of a speech recognizer. A recognition results processor evaluates the quality of candidate results generated by the speech recognizer according to a set of quality thresholds that may differ on a word-by-word basis. In the preferred embodiment, the recognition results processor determines whether individual candidate results are good, questionable, or bad; and whether two or more candidate results are ambiguous due to a significant likelihood that each such result could be a valid command. The recognition results processor additionally identifies a best candidate result.

Based upon the outcome of a quality evaluation, an interpreter facilitates navigation through speech UI menus or invocation of voice messaging functions, in conjunction with a speech UI structure, a voice messaging function library, and the recognition command generator. If the recognition results processor has determined that candidate results are questionable or ambiguous, the interpreter, in conjunction with an ambiguity resolution UI structure and the recognition command generator, initiates confirmation operations in which the subscriber is prompted to confirm whether the best candidate result is what the subscriber intended.

In response to repeated speech recognition failures, the interpreter initiates a transfer to a DTMF UI, in conjunction with a DTMF UI structure and the voice messaging function library. Transfer to the DTMF UI is also performed in response to detection of predetermined DTMF signals issued by the subscriber while the speech UI is in context. The present invention therefore provides for both automatic and subscriber-selected transfer to a reliable backup UI.

If a best candidate result corresponds to a voice messaging function, the interpreter directs the mapping of the best candidate result to a digit sequence, and subsequently transfers control to a voice messaging function to which the digit sequence corresponds. Because the present invention provides both a speech and a DTMF UI, the mapping of candidate results allows the speech UI to seamlessly overlay portions of a standard DTMF UI, and utilize functions originally written for the DTMF UI. The present invention also relies upon this mapping to facilitate simultaneous availability of portions of the speech UI and DTMF UI while remaining within the context of the speech UI. Thus, while at particular positions or locations within the speech UI, the present invention can successfully process either speech or DTMF signals as valid input for speech UI navigation.

The SRVMS thus provides a high level of error tolerance and error prevention to successfully determine a subscriber's intentions, and further provides access to a DTMF UI in parallel with portions of the speech UI or as a backup in situations where repeated speech recognition failure is likely.

A logging unit and a reporting unit operate in parallel with the speech UI, in a manner that is transparent to subscribers. The logging unit directs the selective logging of subscriber utterances, and the reporting unit selectively generates and maintains system performance statistics on multiple detail levels.

The present invention flexibly controls speech recognition, candidate result quality evaluation, utterance logging, and performance reporting through a plurality of parameters stored within a Speech Parameter Block (SPAB). Each SPAB preferably corresponds to a particular speech UI menu.

DETAILED DESCRIPTION OF THE PREFERRED EMBODIMENTS

In the present invention, the term "subscriber" refers to a given telephone system user having direct access to voice messaging services, such as voice mail, message store and forward, and message distribution operations. The terms "nonsubscriber" and "non-user" refer to a telephone system user having no direct access to voice messaging services other than the ability to contact a subscriber, such as by entering a paging dialogue or leaving a voice message in the event that the subscriber fails to answer the nonsubscriber's call. The terms "mobile subscriber" and "mobile nonsubscriber" are analogously defined for mobile or cellular telephone users.

Figure 1:
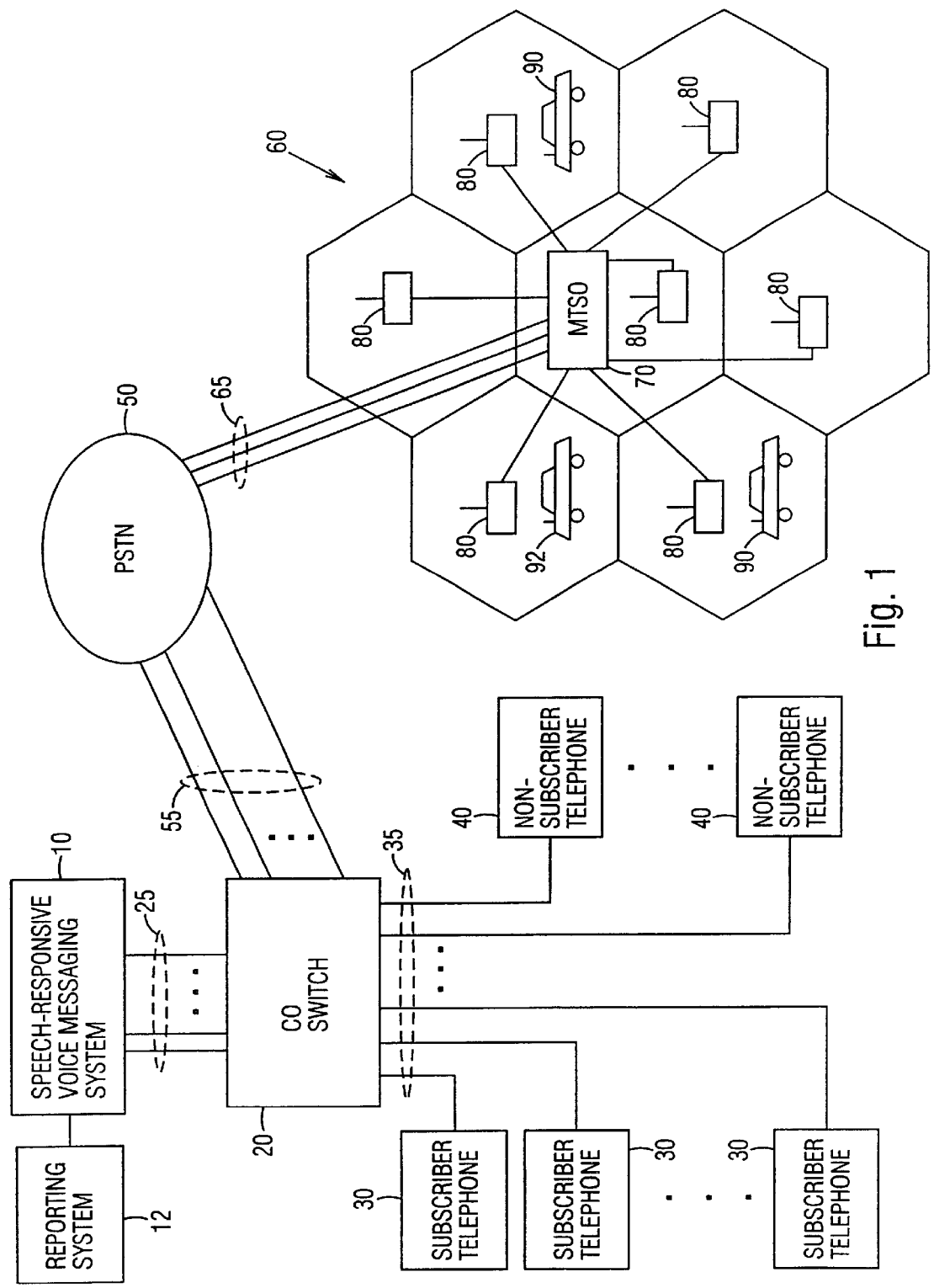
FIG. 1 is a block diagram of an exemplary voice messaging environment in which the present invention functions.

Referring now to FIG. 1, a block diagram of an exemplary Voice Messaging (VM) environment employing a Speech-Responsive Voice Messaging System (SRVMS) 10 is shown. In the exemplary voice messaging environment, the SRVMS 10 is coupled to a reporting system 12. Additionally, a Central Office (CO) switch 20 couples a set of subscriber telephones 30, a set of non-subscriber telephones 40, a Public-Switched Telephone Network (PSTN) 50, and the SRVMS 10. The PSTN 50 is further coupled to a Mobile Telephone Switching Office (MTSO) 70 within a cellular telephone system service area 60. The MTSO 70 exchanges information with a set of cellular radio facilities 80 to provide telephone service to one. or more mobile subscriber telephones 90 and mobile nonsubscriber telephones 92. With the exception of the SRVMS 10, the elements and their couplings shown in FIG. 1 are preferably conventional.

Those skilled in the art will recognize that many variations upon the exemplary voice messaging environment of FIG. 1 can be provided. For example, the MTSO 70 could be directly coupled to the CO switch 20 rather than through the PSTN 50; or the elements directed to cellular telephony could be replaced with elements representative of satellite telephony. The voice messaging environment shown in FIG. 1 is useful to aid understanding, and does not limit the applicable scope of the present invention.

The SRVMS 10 provides a speech User Interface (UI) through which subscribers can verbally navigate through one or more menus to select VM service options. Those skilled in the art will understand that the provision of specific SRVMS functions may be conventionally limited to one or more particular subsets of mobile and/or non-mobile subscribers. In response to a subscriber speaking particular command words or phrases within the context of any given menu, the SRVMS 10 invokes corresponding voice messaging services.

Figure 2:
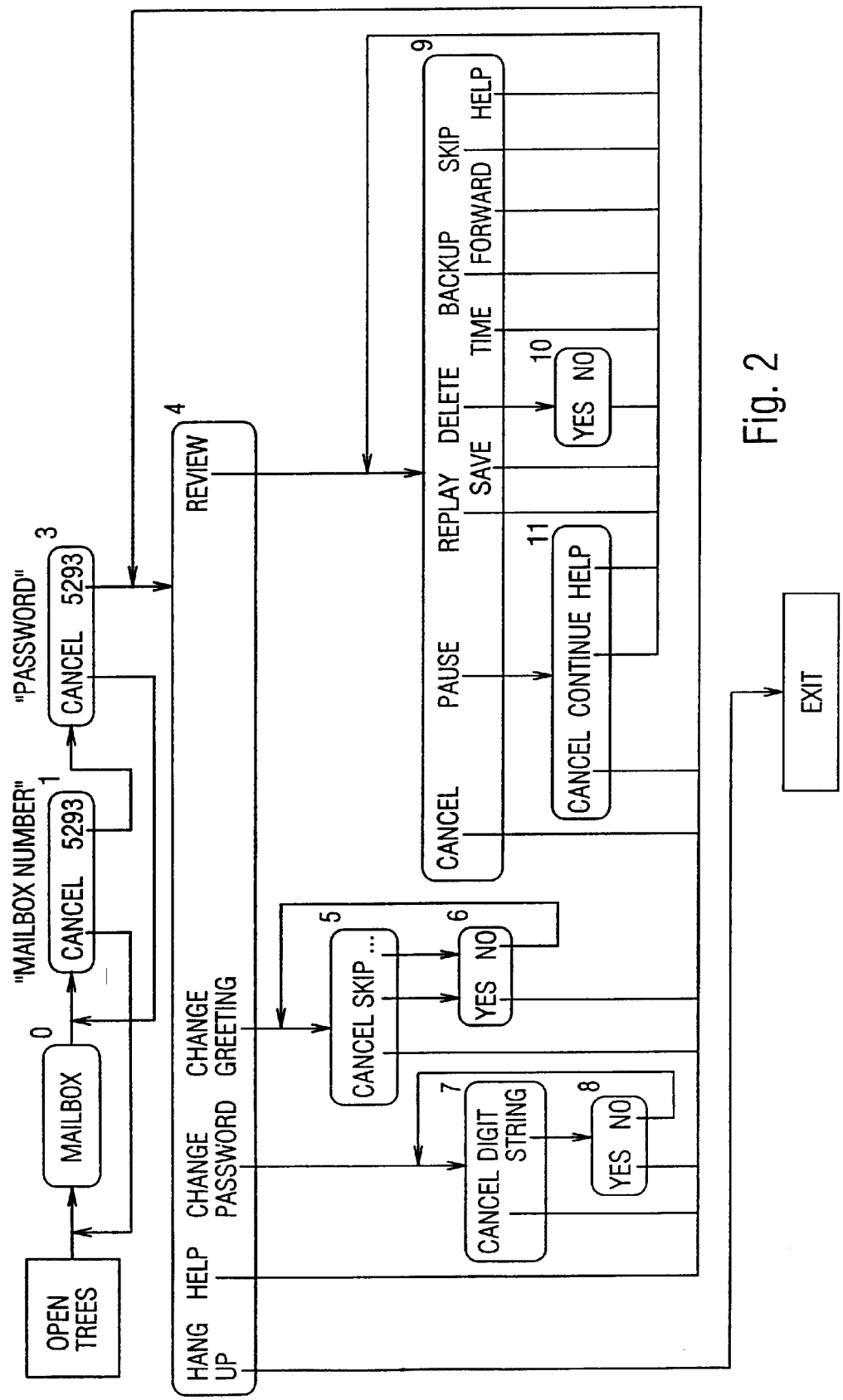
FIG. 2 is a flowchart of a preferred minimal set of speech user-interface menu options provided to voice messaging subscribers by the present invention.

Referring now to FIG. 2, a flowchart showing a preferred minimal set of speech UI menu options provided to subscribers is shown. For each menu shown in FIG. 2, the SRVMS 10 issues a voice prompt to a subscriber. Preferably, the voice prompt specifies a list of target command words or phrases, and optionally either an additional description or a voice messaging service to which each target command word or phrase corresponds. As shown in FIG. 2, the preferred minimal set of speech UI menu options includes a menu for the entry of a subscriber's mailbox number; a menu for the entry of the subscriber's password; a main menu from which administrative operations or transfer to a message review menu can be selected; and the message review menu itself. Additionally, the minimal set of speech UI menu options provides submenus for skipping, canceling, or confirming particular operations. Those skilled in the art will recognize that additional menus and/or submenus, as well as menu or submenu options, can be provided. For example, a menu could be added to provide subscribers with the options of sending a message, replying to a message, or forwarding a message; or a menu could be added to support outcalling operations, in a manner readily understood by those skilled in the art. Preferably, the total number of menus and submenus through which a subscriber must navigate is kept to a reasonable number to facilitate ease of use. Exemplary voice prompts include "mailbox number please," "password please," and ""Main menu:

choices are review, change greeting, change password, and hang up." Short voice prompts that convey a high level of meaning are preferably utilized within each speech UI menu to help maximize the speed of interactions between subscribers and the SRVMS 10.

In the preferred embodiment, the speech UI is designed such that navigation through a minimum number of speech UI menus is required to access a most common set of voice messaging operations. In contrast to a standard DTMF UI, the speech UI preferably incorporates more commands into particular menus, thereby resulting in fewer menus than a DTMF UI. The preferred speech UI is therefore referred to as being hierarchically flatter than a DTMF UI. This type of speech UI enhances ease of use by reducing a subscriber's "learning curve," and aiding memorization of particular command locations within the speech UI.

The SRVMS 10 can be applied to essentially any VM environment in which verbal navigation through a speech UI may be useful. For example, the SRVMS 10 can be applied to VM environments that include essentially any wireless telephone system; or where DTMF service is unavailable, as might be the case in developing countries.

System Composition

Figure 3:
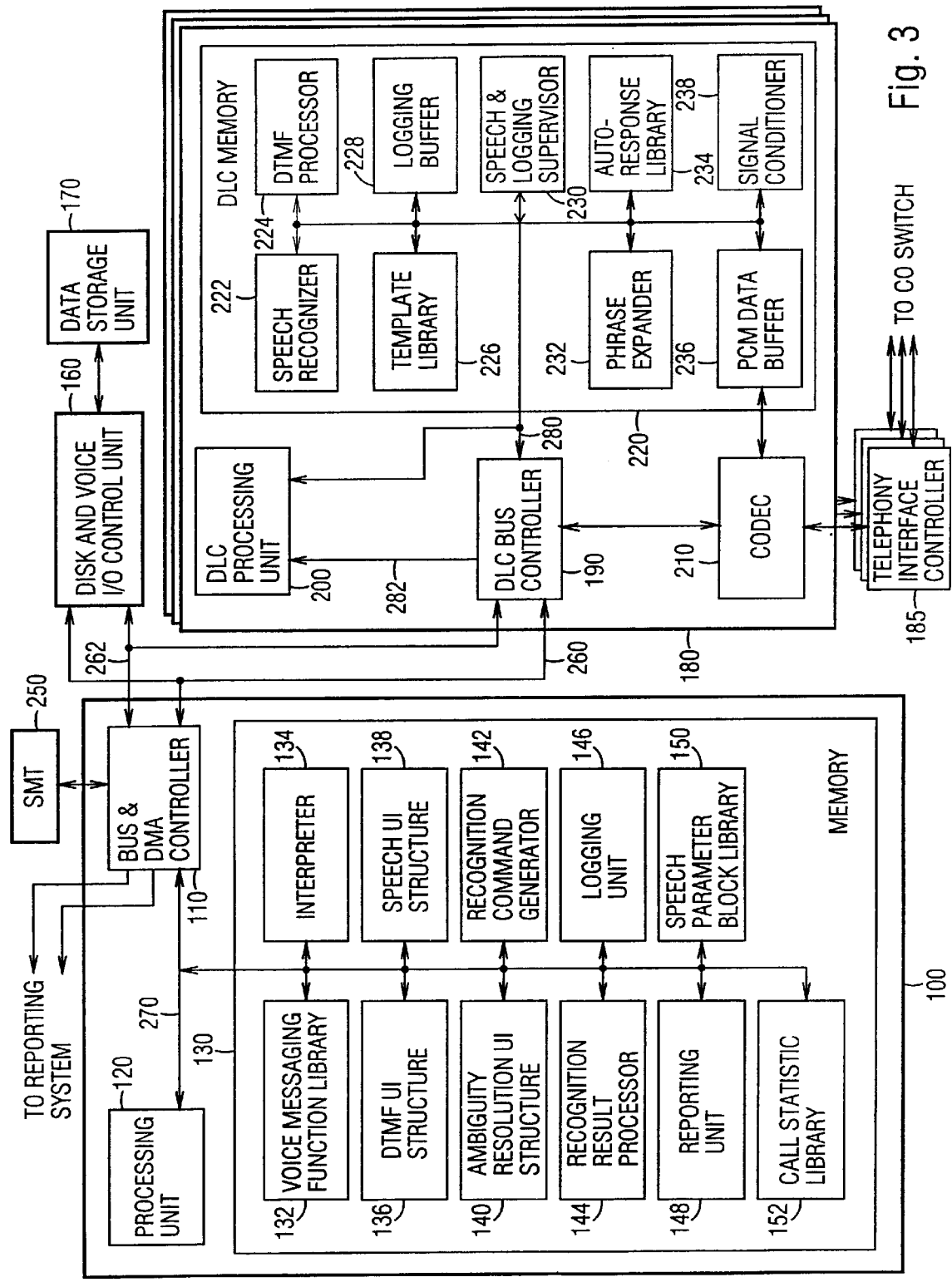
FIG. 3 is a block diagram of a preferred embodiment of a Speech-Responsive Voice Messaging System constructed in accordance with the present invention.

Referring now to FIG. 3, a block diagram of a preferred embodiment of the Speech-Responsive Voice Messaging System 10 constructed in accordance with the present invention is shown. The SRVMS 10 comprises a system control unit 100, a disk and voice Input/Output (I/O) control unit 160, a data storage unit 170 upon which a database directory entry and a mailbox for each subscriber reside, at least one Digital Line Card (DLC) 180, a Telephony Interface Controller (TIC) 185 corresponding to each DLC 180, and a System Manager's Terminal (SMT) 250. The elements of the SRVMS 10 are selectively coupled via a first control bus 260 and a first data bus 262 in a conventional manner. Each TIC 185 is conventionally coupled to the CO switch 20. In the preferred embodiment, the disk and voice I/O control unit 160, the data storage unit 170, and the SMT 250 are conventional.

The system control unit 100 manages the overall operation of the SRVMS 10, in accordance with system parameter settings received via the SMT 250. The system control unit 100 preferably comprises a bus and Direct Memory Access (DMA) controller 110, a processing unit 120, and a memory 130 in which a Voice Messaging (VM) function library 132, an interpreter 134, a DTMF UI structure 136, a speech UI structure 138, and ambiguity resolution UI structure 140, a recognition command generator 142, a recognition result processor 144, a logging unit 146, a reporting unit 148, a Speech Parameter Block (SPAB) library 150, and a call statistic library 152 reside. The bus and DMA controller 110, the processing unit 120, and each element within the memory 130 is coupled via an internal bus 270. The bus and DMA controller 110 is further coupled to the first data and control buses 260, 262, the SMT 250, as well as the reporting system 12. Preferably, the coupling maintained between the bus and DMA controller 110 and the reporting system 12 includes multiple lines, allowing data transfers according to multiple protocols.

The DLC 180 exchanges voice data with the CO switch 20, processes DTMF signals, and performs speech recognition and logging operations under the direction of the system control unit 100. The DLC 180 preferably comprises a DLC bus controller 190, a DLC processing unit 200, a Coder/Decoder (CODEC) 210, and a DLC memory 220. A speech recognizer 222, a DTMF processor 224, a template library 226, a logging buffer 228, a speech and logging supervisor 230, a phrase expander 232, an auto-response library 234, a Pulse Code Modulation (PCM) data buffer 236, and a signal conditioner 238 reside within the DLC memory 220. Each element within the DLC memory 220 is coupled to the DLC bus controller 190 and the DLC processing unit 200 via a second data bus 280. The DLC bus controller 190 is coupled to the DLC processing unit 200 via a second control bus 282. Additionally, the DLC bus controller 190 is coupled to the first data and control buses 260, 262. The CODEC 210, the phrase expander 232, the signal conditioner 238, and the DTMF processor 224 are preferably conventional. The CODEC 210 is coupled to the PCM data buffer 236 and the DLC bus controller 190 to effect DMA-type operations between the PCM data buffer 236 and the TIC 185.

Key Requirements and Functional Abilities

In order to provide successful speech-responsive VM, several key interrelated requirements must be met. The nature of these key requirements and the manner in which they are facilitated by individual elements within the SRVMS 10 is hereafter described.

I. A first key requirement is the ability to detect a subscriber's utterance, and identify particular command words or phrases to which the utterance may correspond. This ability is provided by the speech recognizer 222 in conjunction with the template library 226 and autoresponse library 234.

The speech recognizer 222 is preferably conventional, and provides speaker-independent recognition of subscriber utterances in a discrete recognition mode when detection of command words and/or individual digits is required, or a continuous recognition mode when detection of digit strings is required. The speech recognizer 222 also preferably provides a connected recognition mode in which detection of particular conditions results in an automatic restart of a recognition attempt, as described in detail below. When in continuous recognition mode, the speech recognizer 222 can preprocess an utterance to facilitate the identification of individual digits. In the preferred embodiment, the speech recognizer 222 can additionally provide speaker-dependent or speaker adaptive speech recognition.

The template library 226 stores word templates and corresponding word identifications (IDs), which define each valid command word within the speech UI for the speech recognizer 222 in a manner those skilled in the art will readily understand. The autoresponse library 234 stores word templates and corresponding word IDs that define autoresponse command words that the speech and logging supervisor 230 can independently act upon, as described in detail below.

The speech recognizer 222 initiates a recognition attempt under the direction of the speech and logging supervisor 230, as described in detail below. During a recognition attempt, the speech recognizer 222 attempts to determine the closest match or matches between a subscriber's utterance and a vocabulary. Herein, a vocabulary is defined as a subset of the word templates stored in the template library 226. The vocabulary corresponds to the command words or phrases available within a particular speech UI menu. Thus, a vocabulary is an organization of particular word templates. Upon completion of a recognition attempt, the speech recognizer 222 returns recognition results to the speech and logging supervisor 230. Preferably, the recognition results comprise a set of candidate results, where each candidate result includes a candidate word ID and at least one score corresponding to each candidate word ID. To aid understanding, the description herein assumes a single score is associated with each candidate word ID. Predetermined candidate results are preferably reserved for indicating the occurrence of a timeout condition, an Out-of Vocabulary Word (OVW), an unresolvable error, or other "match not possible" conditions.

A variety of recognizer parameters control the manner in which the speech recognizer 222 operates. In the preferred embodiment, the following can be specified by the recognizer parameters: type of recognition to be performed; timeout information; a minimum and a maximum acceptable string length; a reference to a particular vocabulary; a number of candidate results required; and score control information.

II. A second key requirement is the ability to issue appropriately-structured commands for controlling the speech recognizer 222. This is facilitated through the recognition command generator 142 and the speech and logging supervisor 230. In response to a call issued by the interpreter 134, the recognition command generator 142 issues a recognition parameter directive to the speech and logging supervisor 230. Preferably, the recognition parameter directive specifies the previously described recognizer parameters. In response to the recognition parameter directive, the speech and logging supervisor 230 initializes the speech recognizer 222.

The recognition command generator 142 additionally issues a recognition request to the speech and logging supervisor 230. Upon receiving the recognition request, the speech and logging supervisor 230 directs the speech recognizer 222 to initiate a recognition attempt. The speech and logging supervisor 230 additionally initiates the operation of the DTMF processor 224 such that the occurrence of a particular DTMF signal or a hang-up condition can be detected.

After the speech recognizer 222 generates a set of candidate results (or after the DTMF processor 224 generates a result), the speech and logging supervisor 230 either performs autoresponse operations, or transfers the candidate result sets (or a DTMF signal ID) to the control unit memory 130 and returns a value to the interpreter 134 to initiate result processing operations. The sequence of events beginning with the recognition command generator's issuance of the recognition request and ending with the return of a value to the interpreter 134 is referred to herein as a recognition event.

In the preferred embodiment, the speech and logging supervisor 230 performs autoresponse operations in the event that the speech recognizer 222 has detected a particular autoresponse command word stored in the autoresponse library 234. Preferably, the autoresponse words include "faster," "slower," "louder," and "softer." The speech and logging supervisor 230 performs a set of operations corresponding to the detected autoresponse command word. Detection of "faster" or "slower" results in faster or slower message playback, respectively; and detection of "louder" or "softer" respectively results in a volume increase or decrease. The speech and logging supervisor 230 can also perform autoresponse operations in response to the detection of particular error conditions. Autoresponse operations are preferably enabled via a connected recognition mode. After performing autoresponse operations, the speech and logging supervisor 230 initiates another recognition attempt in accordance with the most-recent recognition request.

III. A third key requirement for providing successful speech-responsive VM is the ability to analyze or evaluate the quality of the candidate results. This ability is facilitated through the recognition result processor 144. Following the completion of a recognition event, the recognition result processor 144 determines the whether candidate results are good, bad or questionable. The detailed operations performed by the recognition result processor 144 are described below with reference to FIG. 6.

IV. A fourth key requirement for providing successful speech-responsive VM is the ability to control which portion of the speech UI is presented to the subscriber at any point in time, and selectively transition from one portion of the speech UI to another or invoke a voice messaging function based upon the outcome of the evaluation performed by the recognition result processor 144. This ability is facilitated through the interpreter 134, the speech UI structure 138, and the VM function library 132.

In the preferred embodiment, each UI structure 136, 138, 140 comprises a data structure that hierarchically organizes references to sequences of program instructions that implement either UI navigation operations or VM functions. Each such program instruction sequence is preferably stored within the VM function library 132. The aforementioned hierarchical organization corresponds to the menus and submenus available to subscribers. In the preferred embodiment, each UI structure 136, 138, 140 comprises a tree.

For implementing the speech UI, the interpreter 134 selects or maintains a reference to a position or location within the speech UI structure 136. Based upon the current location within the speech UI structure 136, a value returned by the speech and logging supervisor 230, and the outcome of the recognition result processor's candidate result set evaluation, the interpreter 134 directs control transfers to appropriate program instruction sequences within the VM function library 132. In the preferred embodiment, the interpreter 134 initiates control transfers via event-driven case-type statements. A recognition event that culminates in the execution of a VM function is referred to herein as a communication.

In the present invention, a particular UI is implemented using the interpreter 134, a given UI structure 136, 138, 140, and the set of program instruction sequences within the VM function library 132 that are referenced by the given UI structure 136, 138, 140. Thus, the speech UI structure 136, the interpreter 134, and a particular group of VM functions together implement the present invention's speech UI. Similarly, the DTMF UI structure 136 in conjunction with the interpreter 134 and VM function library 132, implement a DTMF UI, which in the preferred embodiment is defined in accordance with Voice Messaging User Interface Forum (VMUIF) standards. The ambiguity resolution UI structure 140, along with the interpreter 134 and portions of the VM function library 132, implement a confirmation menu within the speech UI, through which a subscriber is prompted to confirm a previous response, as described in detail below with reference to FIG. 7.

Those skilled in the art will recognize that each UI is implemented in accordance with threaded code techniques, in particular, threaded code techniques as commonly defined in the context a programming language such as Forth or Java. While any given UI could be implemented in another manner as readily understood by those skilled in the art, the implementation of a UI as described above results in enhanced portability across different system types, fast operation, reduced storage requirements, and also facilitates simpler system development and testing.

V. A fifth key requirement for providing successful speech-responsive VM is the ability to have one or more portions of a DTMF UI available in parallel with the speech UI, as well as the ability to rely upon the DTMF UI as a backup in situations where repeated speech recognition failures seem likely. This requirement is satisfied by the interpreter 134, the VM function library 132, and the DTMF UI structure 136. Having portions of the DTMF UI available in parallel with the speech UI facilitates the processing of subscriber input regardless of whether such input is in the form of speech or DTMF signals. This concurrent UI provision provides for a) situations in which it may be desirable to process either speech or DTMF signals, and remain within the context of the speech UI, such as when subscriber entry of a mailbox number or password is required; and b) the transfer out of the speech UI and into the DTMF UI in response to receipt of particular DTMF input.

The presence of the DTMF UI to serve as a backup to the speech UI makes the SRVMS 10 more reliable than systems in which speech is the sole input means for UI navigation. In situations where speech recognition is consistently problematic, the DTMF UI enables subscribers to successfully complete their VM tasks.

Those skilled in the art will recognize that transfer to the DTMF UI is only viable in telephony environments in which DTMF is available, unless rotary dialing detection and mapping functionality available for mapping rotary signals to DTMF. Such functionality could be provided, for example, by hardware and/or software residing upon-the-line card 180. Those skilled in the art will recognize that providing a speech UI in a non-DTMF environment may be desirable because the entry of information by rotary dialing can be quite time consuming.

VI. A sixth key requirement for providing successful speech-responsive VM is the ability to control the issuance of selectively-interruptable prompts and messages to the subscriber. This is facilitated through the interpreter 134, a UI structure 136, 138, 140, at least one VM function within the VM function library 132, and the phrase expander 232. In the preferred embodiment, the phrase expander 232 is responsive to signals issued by the DTMF processor 224 and the speech and logging supervisor 230, and will play a prompt or message until a DTMF signal has been detected or the speech and logging supervisor 230 returns recognition results to the recognition result processor 144. Additionally, a prompt may be halted at an earlier time, when the speech recognizer 222 detects the beginning of a recognizable utterance (such as the start of a digit string). This capability is referred to herein as "barge-in," and-is selectively performed in accordance with a set of interruption codes. Providing for voice prompt and message interruptability helps maximize the speed of interactions between the subscriber and the SRVMS 10. In the preferred embodiment, recognition results are not returned to the recognition result processor 144 after autoresponse operations, and hence a prompt will continue playing during and after autoresponse operations.

VII. A seventh key requirement for providing successful speech-responsive VM is the ability to selectively generate and analyze SRVMS performance information. This is facilitated by the logging unit 146, the reporting unit 148, and the speech and logging supervisor 230. The generation and analysis of SRVMS performance information is particularly useful for identifying problems, and tracking the manners in which the system is used. The detailed operations performed by the logging unit 146 and the reporting unit 148 are described below with reference to FIGS. 8 through 10.

Control Parameters

Figure 4A:
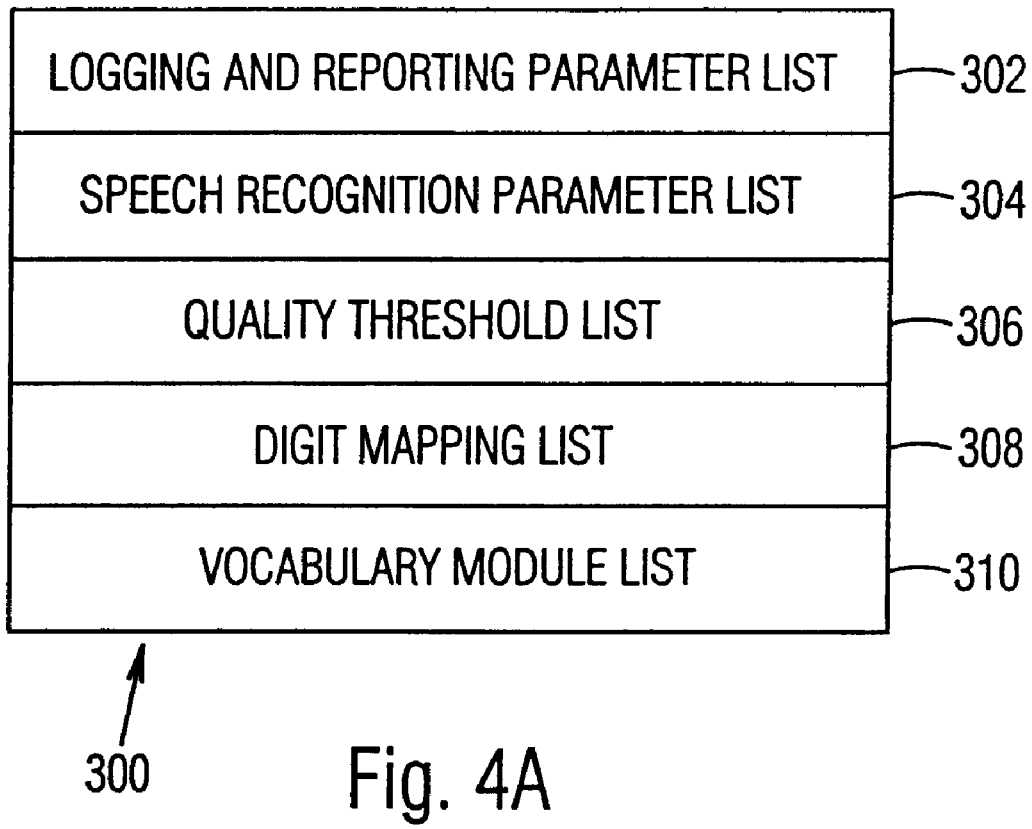
FIG. 4A is a block diagram of a preferred embodiment of a Speech Parameter Block of the present invention.

The present invention relies upon a variety of parameters for controlling the initiation, evaluation, logging, and reporting of speech recognition events. For each- menu within the speech UI, a corresponding SPAB 300 within the SPAB library 150 stores these parameters. Referring now to FIG. 4A, a block diagram of a preferred embodiment of a SPAB 300 is shown. Each SPAB 300 is preferably a data structure that comprises a first data field 302 for storing a list of logging and reporting parameters; a second data field 304 for storing a list of speech recognition control parameters, as well as the previously mentioned interruption codes; a third data field 306 for storing a list of quality thresholds, which are described in detail below; a fourth data field 308 for storing a digit mapping list 308, which is used for mapping word IDs to voice messaging functions, as described in detail below; and a fifth data field 310 for storing a list of references to vocabulary modules.

The logging parameters specify the manners in which the logging unit 146 directs the logging of subscriber utterances, and preferably include condition -codes that selectively specify the following:

whether logging shall be pseudo-random at a call-level, communication level, or recognition event level, selectable in terms of a particular number per 1000 calls, communications, or recognition events, respectively (ranging from 0 per 1000 for never, to 1000 per 1000 for always);

SRVMS port number;

one or more subscriber mailboxes;

one or more menus within the speech UI;

specific word IDs;

recognition types for which logging is to occur;

whether to log good recognitions;

whether to log bad recognitions;

whether to log questionable words or confusing word pairs;

whether to log commands or digits;

specific error or OVW conditions to be logged; and sampling parameters.

The sampling parameters are used by the speech and logging supervisor 230, and preferably specify whether logging is to occur for raw or preprocessed (i.e., echo-canceled) speech; and timing definitions that indicate at what point during speech recognition logging is to begin and end. The detailed operations performed by the logging unit 146 are described below with reference to FIGS. 8, 9A, and 9B.

The reporting parameters control the manner in which the reporting unit 148 operates, and preferably specify whether reporting is to occur, plus control conditions indicating whether reporting is to be performed on a per-recognition basis, a per-communication basis, or a per-call basis. The detailed operations performed by the reporting unit 148 are described below with reference to FIG. 10.

The speech recognition parameters specify initialization and recognition settings for the speech recognizer. In the preferred embodiment, the speech recognition parameters indicate a type of recognition to be performed; timeout information; a minimum and a maximum acceptable string length; a reference to a particular vocabulary; a number of candidate results required; score control information; and error control information.

Figure 4B:
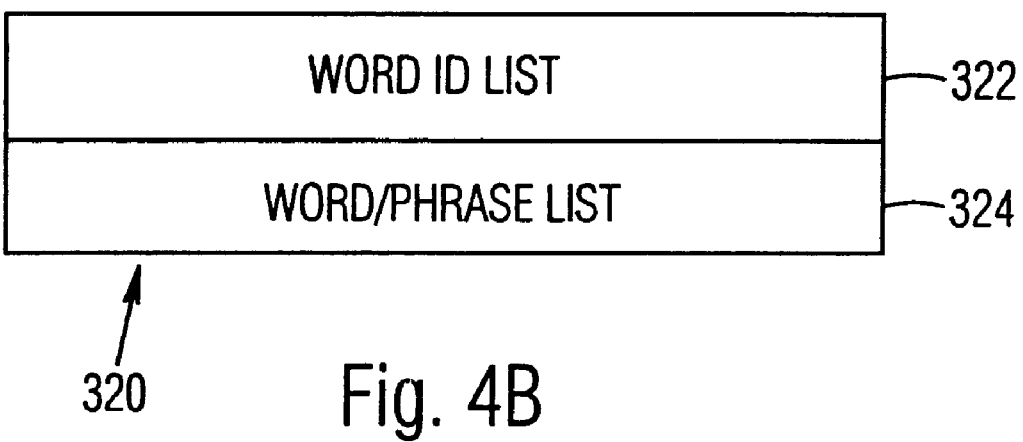
FIG. 4B is a block diagram of a preferred embodiment of a vocabulary module of the present invention.

Referring also now to FIG. 4B, a block diagram of a preferred embodiment of a vocabulary module 320 is shown. Each vocabulary module 320 is a data structure comprising a first data field 322 for storing a list of word IDs, and a second data field 324 for storing a word or phrase corresponding to each word ID. Any given vocabulary module 320 specifies the command words or phrases that are available to the subscriber within a particular menu of the speech UI. In the preferred embodiment, a collection of SPABs 300 exist for each language supported by the SRVMS 10.

Embodiment Details

In the preferred embodiment, each of the interpreter 134, the recognition command generator 142, the recognition result processor 144, the logging unit 146, and the reporting unit 148 comprise a sequence of program instruction sequences that are executable by the processing unit 120 and stored in the memory 130. Similarly, each of the speech recognizer 222, the DTMF processor 224, the speech and logging supervisor 230, the phrase expander 232, and the signal conditioner 238 comprise program instruction sequences executable by the DLC. processing unit 200 and stored in the DLC memory 220. The DLC processing unit 200 is preferably implemented using a commercially-available Digital Signal Processor (DSP). Those skilled in the art will recognize that one or more portions of the aforementioned elements may instead be implemented as hardware in an alternate embodiment, and will also understand that the DLC processing unit 200 does not have to be a DSP (for example, a Pentium processor (Intel Corporation, Santa Clara, Calif.) could be used).

In an exemplary embodiment, the SRVMS 10 is an Octel Sierra system (Octel Communications Corporation, Milpitas, Calif.) having the elements shown within the system controller memory 130 and the DLC memory 220; an 80486 microprocessor (Intel Corporation, Santa Clara, Calif.) serving as the DLC bus controller 190; a Texas Instruments C31 DSP (Texas Instruments Corporation, Dallas, Tex.); Portable Recognizer Library (PRL) software (Voice Processing Corporation, Cambridge, Mass.); and a personal computer having a Pentium or similar processor to serve as the SMT 250, which is coupled to the bus and DMA controller 110 via a conventional X.25 coupling and a Small Computer System Interface (SCSI) bus. In an alternate embodiment, the SRVMS 10 could be implemented in a unified or integrated voice messaging system, such as that described in U.S. Pat. No. 5,557,659, entitled "Electronic Mail System Having Integrated Voice Messages." In such implementations, elements of the SRVMS 10 shown in FIG. 3 reside within a voice server coupled to an electronic mail system, in a manner readily understood by those skilled in the art.

Those skilled in the art will additionally recognize that in yet another embodiment, the SRVMS 10 could be implemented in a single-processor system. In such an embodiment, the DLC processing unit 200 is not present (or equivalently, the DLC processing unit 200 and the processing unit 120 are one and the same), and elements 222, 224, 226, 228, 230, 232, 234, 236, 238 within the DLC memory 220 of FIG. 1 are instead implemented within the control unit memory 130, with the exception of the CODEC 210 in the event that DMA-type transfers from the TIC 185 are required.

Detailed Operation

The manner in which the aforementioned system elements interact sequentially and/or in parallel to implement speech-responsive VM in an essentially seamless manner is described in detail hereafter with reference to FIGS. 5 through 10.

Figure 5:
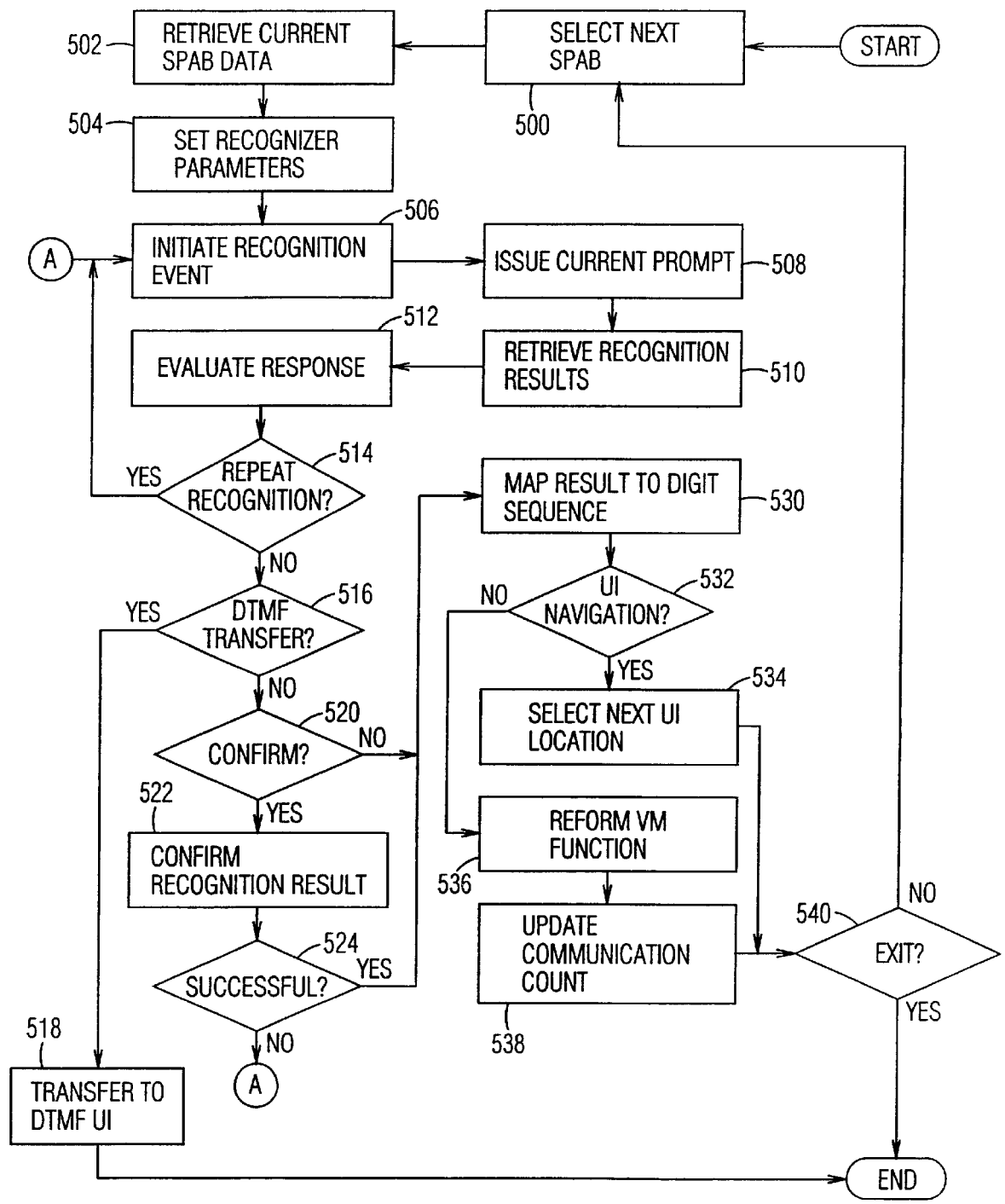
FIG. 5 is a flowchart of a preferred method for providing speech-responsive voice messaging in accordance with the present invention.

Referring now to FIG. 5, a flowchart of a preferred method for providing speech-responsive voice messaging in accordance with the present invention is shown. In the preferred embodiment, the operations performed in FIG. 5 are initiated when the interpreter 134 transfers a reference to an initial SPAB 300 to the recognition command generator 142 in response to an incoming call notification received from the DLC bus controller 190.

The preferred method begins in step 500 with the recognition command generator 142 selecting the initial SPAB 300 for consideration. In the preferred embodiment, the first SPAB 300 corresponds to a mailbox number entry menu. Those skilled in the art will recognize that the first SPAB 300 could correspond to some other menu, such as a welcome menu that could facilitate offering a subscriber a choice between use of the speech and DTMF UIs. Next, the recognition command generator 142 retrieves the recognizer parameters within the currently-selected SPAB 300 in step 502, and issues a recognition parameter directive to the speech and logging supervisor 230 step 504. The speech and logging supervisor 230 subsequently initializes the speech recognizer 222 accordingly. Then, in step 506, the recognition command generator 142 issues a recognition request, thereby initiating a recognition event. After step 506, a voice messaging function within the VM fuction library 132 selects a current prompt, and issues a prompt notification to the phrase expander 232 in step 508. In turn, the phrase expander 232 issues the current prompt to the subscriber in a conventional manner, that is, via the PCM data buffer 236, the CODEC 210, and the TIC 185. The prompt is preferably played until a DTMF signal has been detected, or the speech and logging supervisor 230 returns a candidate result set to the control unit 100.

Following step 508, the recognition result processor 144 retrieves the candidate result set in step 510. In the preferred embodiment, the interpreter 134 initiates control transfer to the recognition result processor 144 in response to the speech and logging supervisor's return of a value indicating a candidate result set requires evaluation. The recognition result processor 144 subsequently evaluates the quality of the returned candidate results in step 512, as described in detail below with reference to FIG. 6, and preferably returns a value to the interpreter 134 that indicates the outcome of this evaluation.

Based upon the value received from the recognition result processor 144, the interpreter 134 determines whether recognition is to be repeated in step 514. If the outcome of the recognition result processor's evaluation indicates that the subscriber's response was bad, and a recognition repeat count has not been exceeded, recognition must be repeated. A bad response could result from any significant audible event that was not an expected word, possibly arising from, for example, excessive background sound. In the event that recognition must be repeated, the preferred method returns to step 506 to initiate another recognition event. In the preferred embodiment, the current prompt issued in step 508 can vary according to the number of times recognition has been repeated.

In the event that a subscriber's response was bad and the repeat count has been exceeded, the interpreter 134 transitions to the DTMF UI via steps 516 and 518. After step 518, the preferred method ends.

If neither recognition repetition nor transfer to the DTMF UI are required, the interpreter 134 determines whether recognition confirmation is required in step 520. In the present invention, confirmation is required when the outcome of the evaluation indicates a questionable or ambiguous response. If confirmation is required, the interpreter 134 selects a position or location within the ambiguity resolution UI structure 140, and transfers a reference to a confirmation SPAB 300 to the recognition command generator 142 in step 522 to initiate confirmation operations as described in detail below with reference to FIG. 7. After step 522, the interpreter determines whether the confirmation was successful in step 524. If not, the preferred method returns to step 506.

When confirmation is not required in step 520, or after a successful confirmation in step 524, the interpreter 134 transfers control to a mapping function that maps the best candidate word ID to a digit sequence in step 530. The mapping function relies upon data within the current SPAB 300 to perform mapping operations. The interpreter 134 subsequently determines whether the mapped digit sequence corresponds to a speech UI navigation operation in step 532. If so, the interpreter 134 selects a position or location within the speech UI in step 534. In the event that a VM function is required rather than speech UI navigation, the interpreter transfers control to a VM function that corresponds to the mapped digit sequence in step 536. In the preferred embodiment, a digit string is interpreted as a single entity.

A VM function that directs message playback preferably operates in conjunction with the recognition command generator 142 and recognition result processor 144 such that the recognition and evaluation of subscriber utterances is selectively performed while a message is played to the subscriber. This in turn helps maximize interaction speed between the SRVMS 10 and the subscriber.

After step 536, the interpreter 134 updates a communication count in step 538. Herein, a communication is defined as a successful speech UI interaction with a subscriber that culminates in the execution of a voice messaging function. The communication count is selectively utilized by the reporting unit 148, as described in detail below with reference to FIG. 10.

Those skilled in the art will recognize that the digit sequence generated in step 530 could correspond to a sequence of DTMF commands that would request the same voice messaging service had the subscriber interacted with the DTMF UI. Thus, the mapping performed in step 530 allows the SRVMS 10 to directly use one or more program instruction sequences originally written for implementing voice messaging functions on a DTMF-only system. Thus, the speech UI provided by the present invention can partially or entirely overlay a conventional DTMF UI, potentially increasing system reliability and/or reducing system development time. Moreover, the speech UI provided by the present invention can seamlessly overlay two or more non-identical DTMF UIs.

After steps 534 or 538, the interpreter 134 determines whether the subscriber's call is complete in step 540. If so, the preferred method ends. Otherwise, the preferred method proceeds to step 500, where the interpreter 134 selects an appropriate SPAB 500 for consideration. Call completion is preferably indicated when the DTMF processor 224 detects a hangup condition, or a command word or phrase such as "hang up" is successfully detected and processed.

In the preferred embodiment, successful recognition of the word "help" causes the interpreter 134 to transition to a particular help menu within the speech UI via the selection of a corresponding help SPAB 300. Preferably, a variety of help SPABs 300 exist, to facilitate the implementation of context-sensitive user assistance from any main speech UI menu. The interpreter's selection of a particular help SPAB 300 is thus based upon the position or location within the speech UI from which the subscriber requested help.

Figure 6:
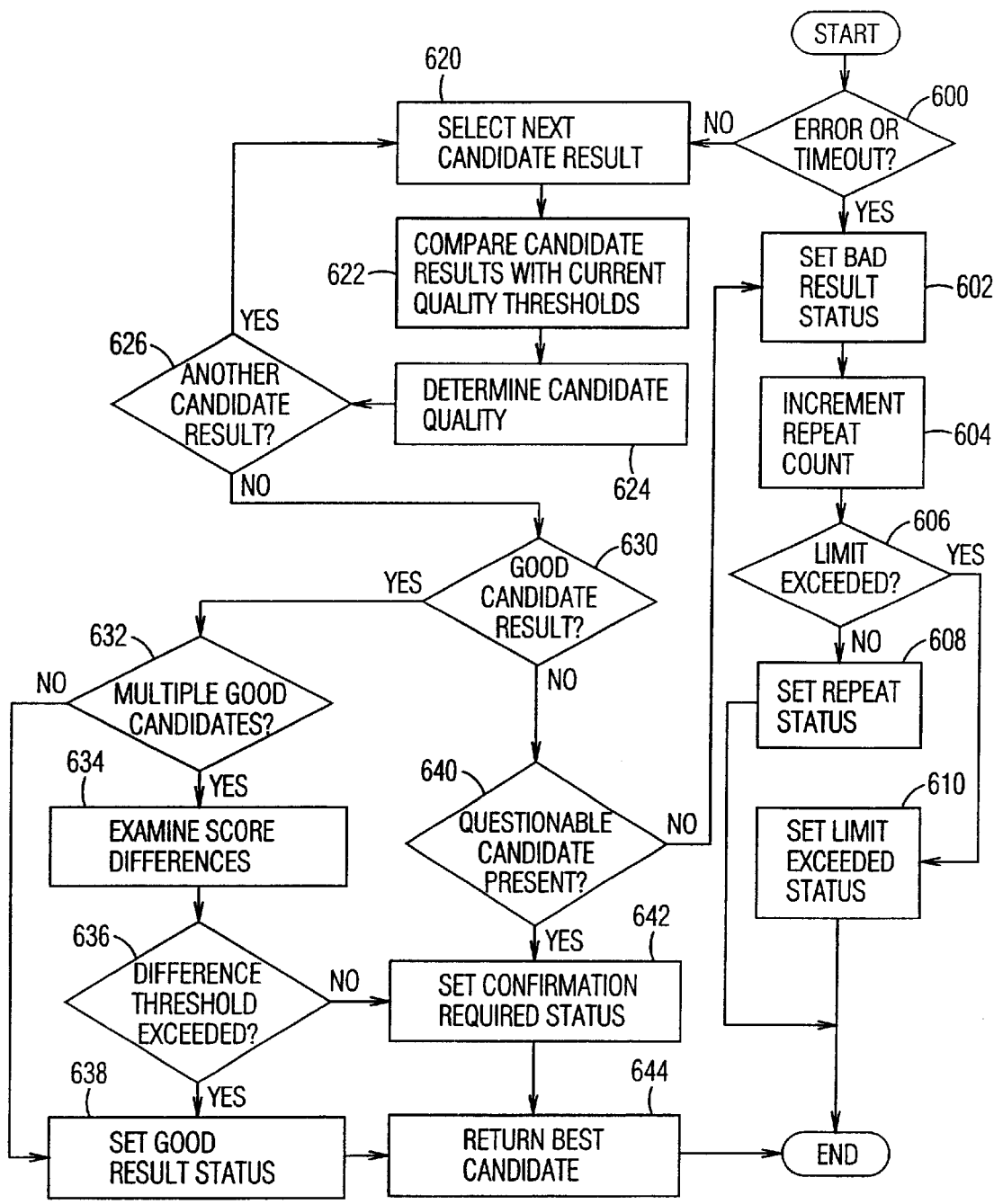
FIG. 6 is a flowchart of a preferred method for evaluating a speech recognition result in the present invention.

Referring now to FIG. 6, a flowchart of a preferred method for evaluating a speech recognition result (step 510 of FIG. 5, and step 710 of FIG. 7) is shown. The preferred method begins in step 600 with the recognition result processor 144 determining whether the candidate result set indicates that an unrecoverable error or a timeout condition had occurred. If so, the recognition result processor 144 sets a bad result status indicator in step 602, and increments a repeat count in step 604. When evaluating the quality of confirmation results, the recognition result processor 144 increments a confirmation repeat count; otherwise, the recognition result processor 144 increments a recognition repeat count. If an appropriate repeat count limit has been exceeded, the recognition result processor 144 sets a corresponding limit exceeded status via steps 606 and 610. In the event that the appropriate repeat count limit has not been exceeded, the recognition result processor 144 sets a repeat status indicator in step 608. After either of steps 608 or 610, the preferred method ends.

If no error or timeout occurred, the recognition result processor 144 selects a first candidate result in step 620. The recognition result processor 144 then compares the score within the selected candidate result with a group of threshold scores corresponding to the selected candidate result's word ID in step 622. Preferably, the threshold scores for each valid word ID within a speech UI menu stored are stored in the current SPAB 300. In the preferred embodiment, a first threshold score establishes a first quality level above which the candidate result is deemed "good." A second threshold score establishes a second quality level, below which the candidate result is deemed "bad." Between the first and second quality levels, the candidate result is deemed "questionable." Those skilled in the art will recognize that in an alternate embodiment, additional quality threshold levels could be defined, such as "very good." Those skilled in the art will also recognize that in embodiments where the speech recognizer returns multiple types of scores for a single candidate word ID, separate types of threshold scores could be analogously defined. In an alternate embodiment, the recognition result processor 144 additionally performs statistical language modeling operations to aid quality evaluation.

After step 622, the recognition result processor 144 marks the currently-selected candidate result in accordance with its quality designation in step 624. The recognition result processor 144 then determines whether another candidate result requires consideration in step 626. If so, the preferred method returns to step 620.

Once each candidate result has been considered, the recognition; result processor 144 determines whether at least one candidate result has been designated as "good" in step 630. If so, the recognition result processor 144 determines whether multiple good candidate results are present in step 632. If only one candidate result has been designated as good, the recognition result processor 144 sets a good result status indicator in step 638, and returns this candidate result in step 644, after which the preferred method ends.

When multiple good candidate results are present, the recognition result processor 144 examines the score differences between each good candidate result in step 634, and determines whether a minimum score difference threshold is exceeded in step 636. If the minimum score difference threshold is exceeded, the recognition result processor 144 sets the good result status indicator in step 638, and returns the best candidate result in step 644, after which the preferred method ends. In the preferred embodiment, the best candidate result is defined as the least-uncertain good candidate result (as indicated by the score associated with the word ID), provided the minimum score difference threshold is exceeded. If the minimum score difference threshold is not exceeded, the recognition result processor 144 returns a confirmation required status indicator in step 642, after which the preferred method proceeds to step 644. Thus, the present invention ensures that the generation of potentially ambiguous yet good recognition results in asking the subscriber for confirmation.

In the event that a good candidate result is not present in step 630, the recognition result processor 144 determines whether a questionable candidate result is present in step 640. If so, the preferred method proceeds to step 642. Otherwise, the preferred method proceeds to step 602. In the preferred embodiment, the recognition results processor 144 evaluates candidate results expected to correspond to digit strings such that the quality or validity of any given number within the string is determined.

Figure 7:
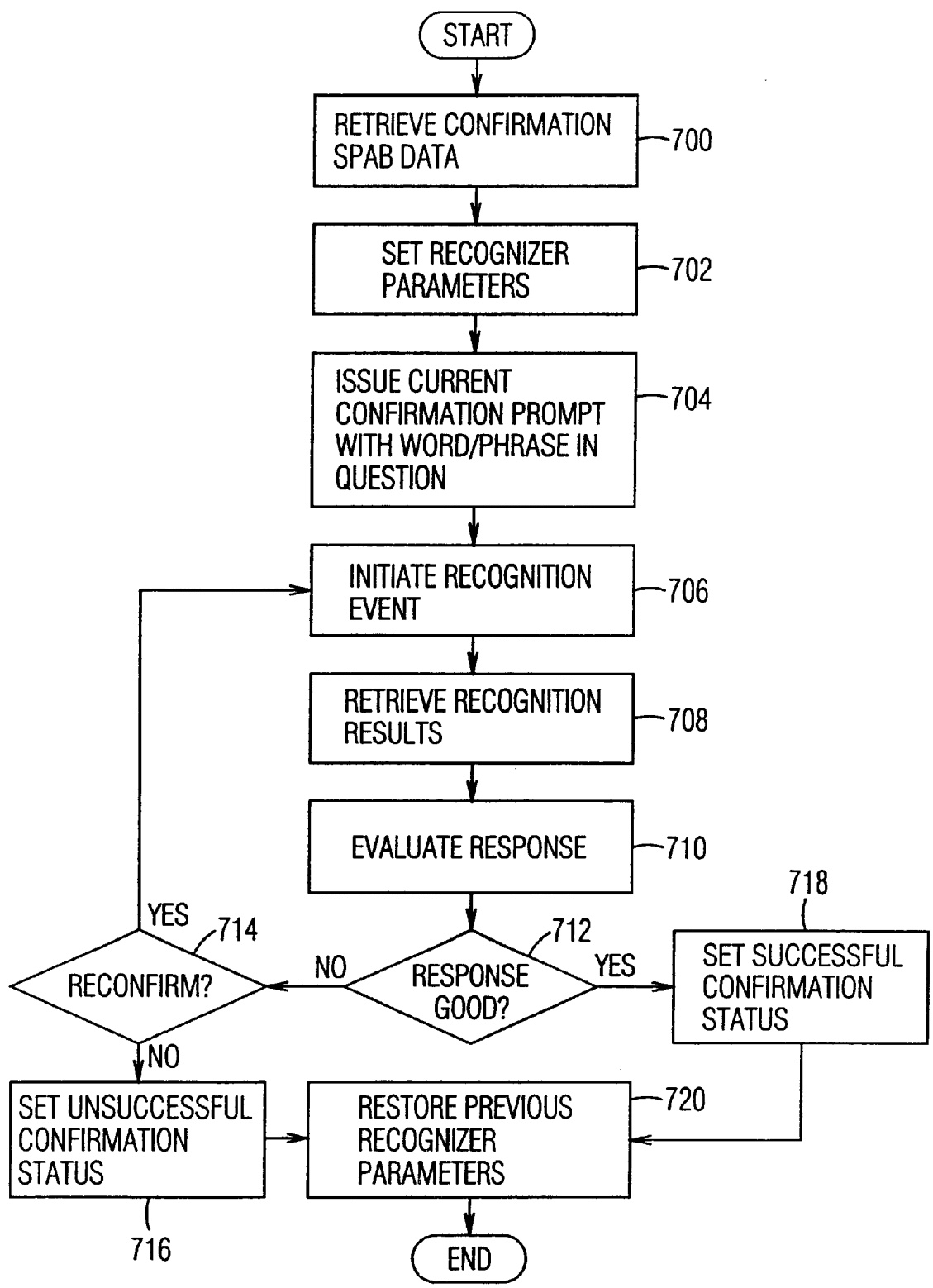
FIG. 7 is a flowchart of a preferred method for confirming a speech recognition result in the present invention.

Referring now to FIG. 7, a flowchart of a preferred method for confirming a speech recognition result (step 540 of FIG. 5) is shown. The preferred method begins in step 700 with the recognition command generator 142 retrieving data within the confirmation SPAB 300. Next, the recognition command generator 142 issues a recognition parameter directive to the speech and logging supervisor 230, which sets recognizer parameters as indicated in the confirmation SPAB 300.

A voice messaging function then determines a current confirmation prompt; and issues a confirmation prompt notification to the phrase expander 232 in step 704. Preferably, the confirmation prompt notification includes a reference to the current confirmation prompt, plus the word ID of the word or phrase requiring confirmation, such that the subscriber is presented with the best word or phrase candidate during the prompt. For example, if the word "review" required confirmation, the current confirmation prompt plus the word ID in question would be presented to the subscriber in a manner such as "Did you say review? Please answer yes or no." The phrase expander 232 issues the current confirmation prompt and the word under consideration to the subscriber in a manner readily understood by those skilled in the art. In the preferred embodiment, interruption of a confirmation prompt is not allowed.

Following step 704, the recognition command generator 142 issues a recognition request, thereby initiating a recognition event in step 706. The speech and logging supervisor 230 preferably returns candidate results for the confirmation to the control:unit-memory 130, and returns a value to the interpreter indicating quality evaluation is required. The interpreter 134 transfers control to the recognition result processor 144 in response.

In steps 708 and 710, the recognition result processor 144 respectively retrieves and evaluates the candidate results returned after the subscriber was prompted for confirmation. Step 710 is performed in accordance with the description of FIG. 6 above. Next, in step 712, the interpreter 134 determines whether the confirmation result was good in step 712. If so, interpreter 134 sets a successful confirmation status indicator in step 718, after which the recognition command generator 142 restores the recognizer parameters specified within the previously-selected SPAB 300 (i.e., the SPAB 300 most-recently selected via step 500 of FIG. 5) in step 720. After step 720, the preferred method ends.

If the result of the confirmation was not good, the interpreter determines whether reconfirmation is required in step 714. Reconfirmation is preferably called for when the recognition result processor 144 has set either the confirmation required status or the repeat status indicator. When reconfirmation is required, the method preferably returns to step 706 to initiate another recognition event. In the preferred embodiment, the current confirmation prompt issued in step 704 varies according to the number of reconfirmation attempts made.

If the recognition result processor 144 has set the confirmation limit exceeded status, the interpreter 134 determines that reconfirmation is not required in step 714, and sets an unsuccessful confirmation status indicator in step 716. After step 716, the preferred method proceeds to step 720.

Utterance Logging

Recording or logging of subscriber utterances is highly useful for aiding system testing and verification, periodic vocabulary building, and problem analysis. Utterance logging, however, requires significant amounts of storage, and thus logging can be quite costly. In the present invention, the logging unit 146 and the speech and logging supervisor 230 control the selective logging of subscriber utterances in accordance with the logging parameters specified in each SPAB 300, such that logging costs can be minimized.

Figure 8:
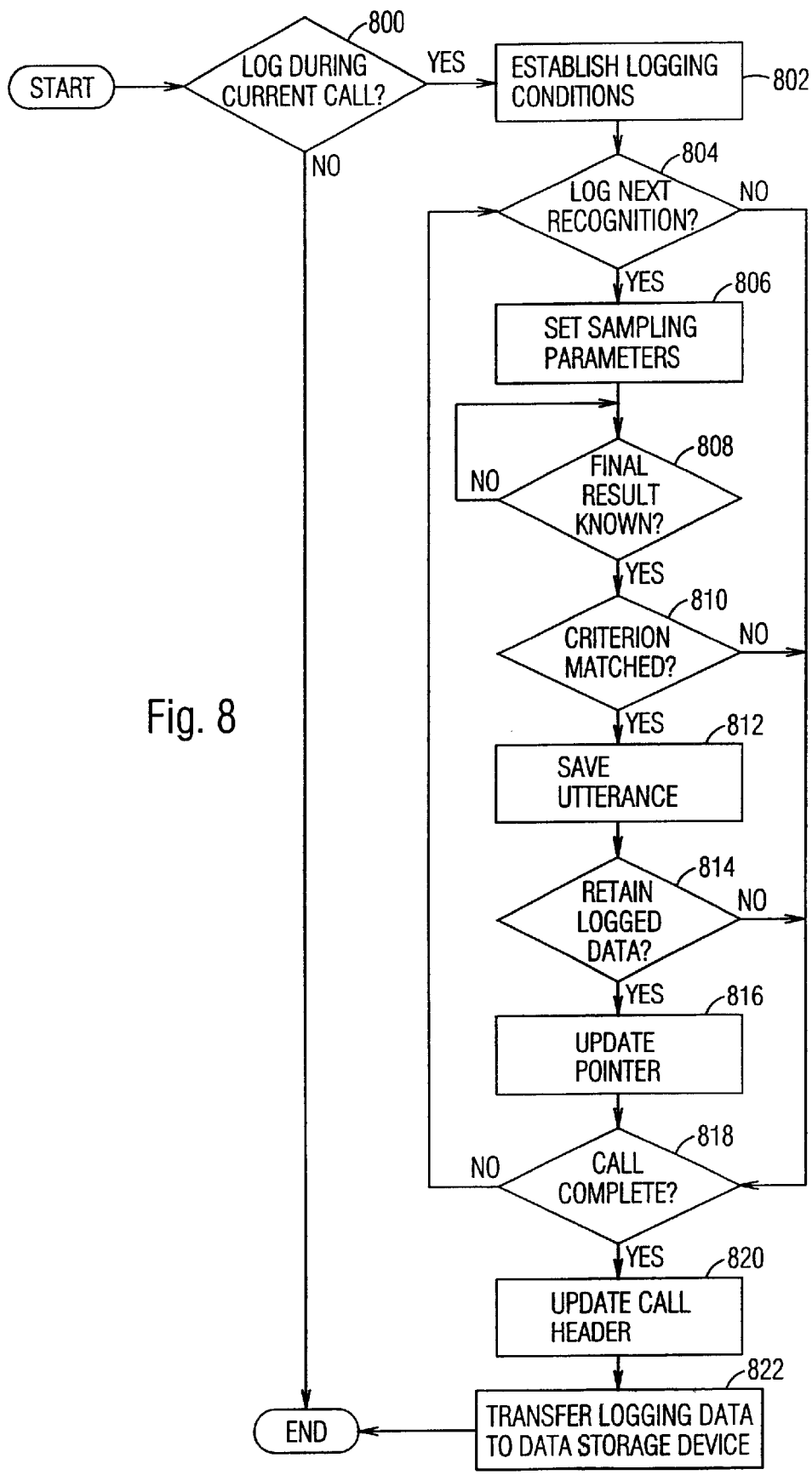
FIG. 8 is a flowchart of a preferred method for utterance logging in the present invention.

Referring now to FIG. 8, a flowchart of a preferred method for utterance logging in the present invention is shown. In the preferred embodiment, the logging unit 146 operates transparently during a call, monitoring the operation of the interpreter 134, the recognition command generator 142, and the recognition result processor 144. The preferred method begins in step 800 with the logging unit 146 examining the logging parameters within the currently-selected SPAB 300 (i.e., the SPAB 300 selected in step 500 of FIG. 5) to determine whether utterance logging is required during the current call. If not, the preferred method ends.

If utterance logging is required, the logging unit 146 establishes the current logging conditions in accordance with the logging parameters in step 802. In the preferred embodiment, the logging parameters indicate various conditions under which logging is required, as previously specified in relation to FIG. 4A. The logging unit 146 next determines in step 804 whether the next recognition event is to be logged. If so, the logging unit 146 issues a set of sampling parameters to the speech and logging supervisor 230 in step 806. The sampling parameters preferably specify whether utterance logging is to begin according to the following reference time definitions:

at the start of a recognition attempt;
when an audio signal has been detected that has a volume and spectral composition that suggests speech, defined herein as the "start of speech"; and
when the speech recognizer 222 is confident that an utterance is meaningful, and has started template matching processes, defined herein as the "start of utterance."

The sampling parameters additionally specify whether utterance logging is to end according to the following reference time definitions:

after a predetermined time has elapsed since the start of utterance logging;
after an end to speech-like data has been detected, defined herein as "end of speech"; and
following the generation of candidate results, defined herein as "end of utterance."

Figure 9A:
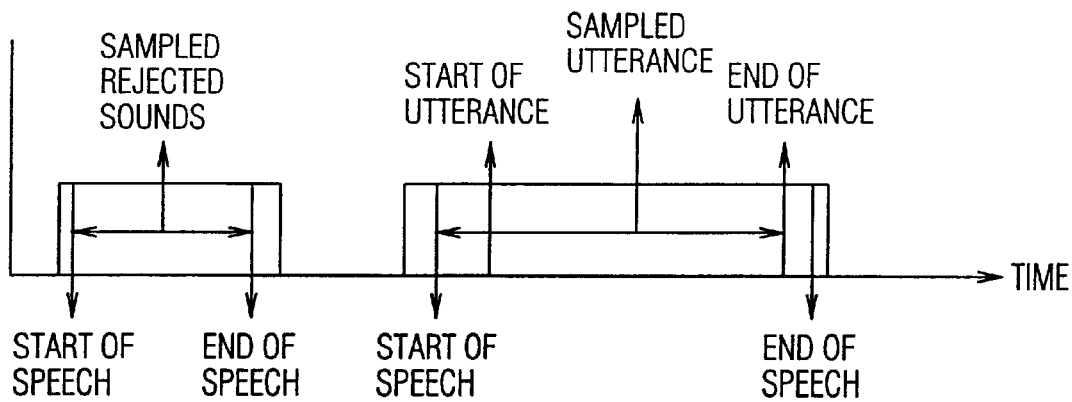
FIG. 9A is a graphical representation of reference times related to utterance sampling.

Referring also now to FIG. 9A, a graphical representation of the reference times defined above is shown. To compensate for time delays in assessing the aforementioned reference times, a buffer preferably holds audio data corresponding to the most-recent 1 second interval, such that the sampling period can be extended approximately 0.5 to 1 second relative to the start and end times shown. The speech and logging supervisor 230 directs logging during recognition attempts, and stores logged utterances in the logging buffer 228.

Referring again to FIG. 8, after step 806, the logging unit 146 determines whether the recognition result processor 144 has completed the quality evaluation for the current candidate results in step 808. If not, the preferred method remains at step 808. Once the final result of the most recent recognition event is known, the logging unit 146 determines whether any criteria specified in the logging parameters are matched in step 810. If so, the logging unit 146 instructs the speech and logging supervisor 230 to save an utterance header and the utterance recorded during the most recent recognition event in step 812. The utterance header preferably includes a reference to a position or location within the speech UI; a retry count; a communication count; the candidate result set generated by the speech recognizer 222; timing data issued by the recognizer; timing data related to prompt playing and interruption; and timing data corresponding to the arrival of external events such as a DTMF signal or a hang-up. The utterance itself is preferably encoded according to 8-bit mu-law protocols. Each utterance header and corresponding utterance is preferably saved in the logging buffer 228, at a location given by a reference or pointer to an available storage location within the logging buffer 228. The logging unit 146 preferably maintains this pointer. Upon completion of step 812, the logging unit 146 examines the current logging parameters and determines whether the saved utterance should be retained for later use in step 816. Under particular circumstances, knowledge of whether logged utterances should be saved cannot be ascertained until the subscriber's call has proceeded to a certain point within the speech UI. For example, the initiation of logging preferably occurs at the beginning of a call. If logging is to occur for a particular password number, however, the subscriber's password number will not be known until the call has progressed to the point at which the subscriber's utterance(s) made within the context of the password entry menu have been successfully recognized and processed.

If the utterance data is to be retained, the logging unit 146 updates the logging buffer storage location reference to a next available location in step 816.

After step 816, or after steps 804, 810, and 814, the logging unit 146. determines whether the current call is complete in step 818. If not, the preferred method returns to step 804. After the current call is complete, the logging unit 146 generates call header information in step 820, and subsequently transfers the call header information and the set of saved utterances to either the data storage unit 170 or the reporting system in step 822. In the preferred embodiment, the call header information comprises a mailbox ID, a time stamp, and possibly a reference to a Customer Data Record (CDR), which is described in detail below with reference to FIG. 10. After step 822, the preferred method ends.

Figure 9B:
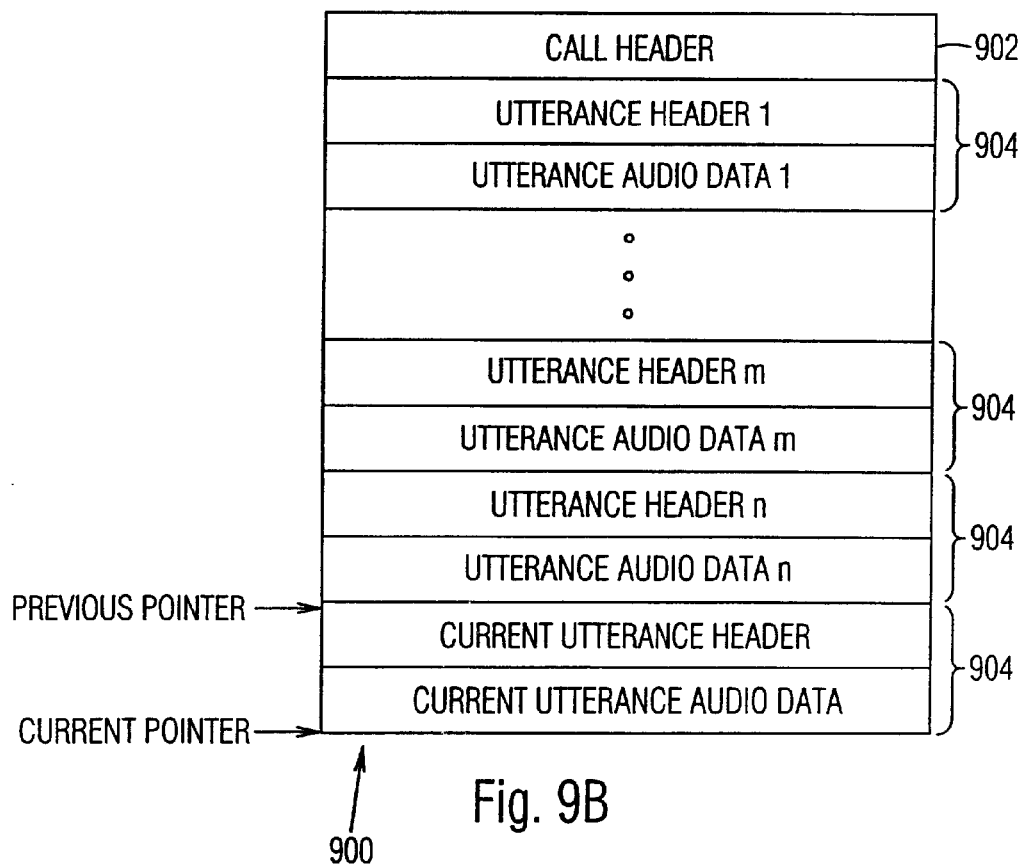
FIG. 9B is a block diagram of a preferred utterance storage format in the present invention.

Referring also now to FIG. 9B, a block diagram of a preferred utterance storage format 900 is shown. In the preferred utterance storage format, a call header 902 is followed by utterance header/utterance audio data sequences 904. Within the logging buffer 228, a pointer to a current logging location and a previous logging location are maintained in a manner readily understood by those skilled in the art.

Reporting

The generation of system performance data is highly useful for system problem analysis. In the present invention, the reporting unit 148 selectively generates various Customer Data Records (CDRs), which store particular system performance statistics. In the preferred embodiment, the reporting unit 148 operates transparently during a call, ;monitoring the operation of the interpreter 134, the recognition command generator 142, and the recognition result processor 144 to track system performance and generate CDRs in accordance with the reporting parameters specified in each SPAB 300. For the generation of each CDR, the reporting unit 148 maintains a set of statistics within the call statistic library 152.

In the preferred embodiment, the reporting unit 148 selectively generates a recognition-level CDR, a communication-level CDR, a call-level CDR, and/or a summary-level CDR. The recognition-level CDR preferably specifies the following:

the results of each recognition within a communication;

the response of the system to predetermined recognition results, as specified within the current SPAB 300;

a logging status for each recognition;

duration of each recognition event; and candidate word IDs and corresponding scores for each recognition event.

The following are preferably specified by the communication-level CDR:

a result indicating an action taken following a communication;

the proportion of subscriber inputs requiring predetermined numbers of recognition attempts, where the predetermined numbers are specified by the SMT 250;

the number of incorrect attempts;

the number of timeouts;

whether an affirmative confirmation occurred; and time duration of the communication.

The call-level CDR provides the following information:

the proportion of a call in which speech was used;

the proportion of digit strings in which speech was used;

the proportion of digit string inputs requiring predetermined numbers of recognition attempts;

the proportion of recognition events in which a timeout occurred;

the proportion of recognition events requiring confirmation;

the proportion of recognition events that failed;

average duration of recognition events; and average communication duration.

Finally, the summary-level CDR contains the following information:

the proportion of calls in which subscribers reverted to using DTMF;

the proportion of calls in which the SRVMS 10 reverted to the DTMF UI;

the proportion of calls in which the speech UI was re-invoked; and the proportion of calls in which a hang-up condition followed an unsuccessful recognition;

Those skilled in the art will readily understand the manner in which the aforementioned information can be generated and/or updated by tracking the operations performed by the interpreter 134, the recognition command generator 142, the recognition result processor 144, the speech and logging supervisor 230, and the speech recognizer 222. Those skilled in the art will additionally recognize that additional or fewer statistics could be generated in an alternate embodiment, according to the usefulness of particular information.

Figure 10:
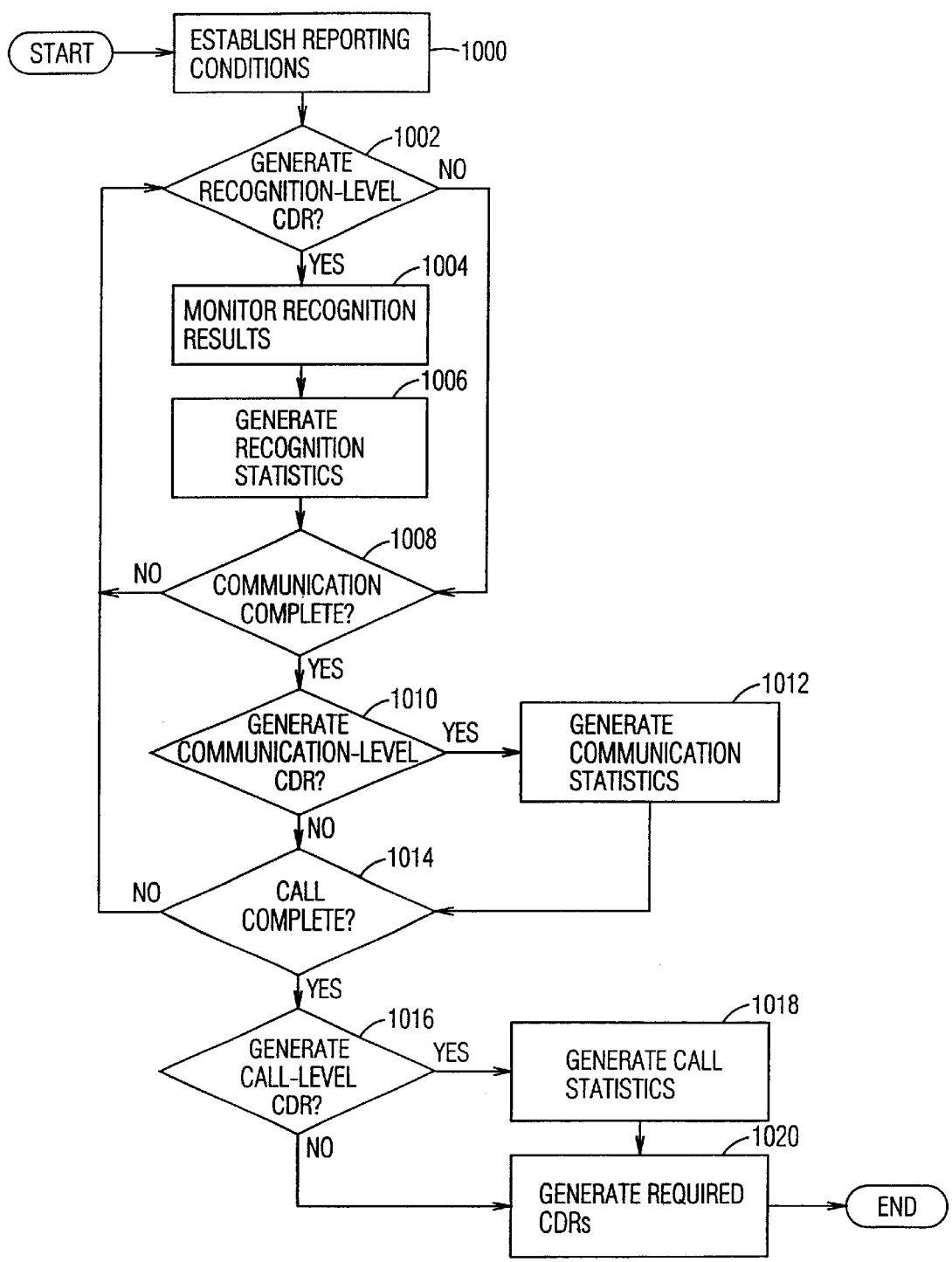
FIG. 10 is a flowchart of a preferred method for generating Customer Data Records in the present invention.

Referring now to FIG. 10, a flowchart of a preferred method for creating Customer Data Records is shown. The preferred method begins in step 1000 with the reporting unit 148 retrieving the reporting parameters specified within the current SPAB 300 to establish current reporting conditions. Next, the reporting unit 148 determines whether a recognition-level CDR is to be generated in step 1002. If so, the reporting unit 148 monitors recognition results and recognition result evaluation processes, and generates and/or updates recognition statistics in steps 1004 and 1006.

After step 1002 or step 1006, the reporting unit 148 determines whether the current communication is complete in step 1008. If not, the preferred method returns to step 1002. Once the current communication is complete, the reporting unit 148 determines whether generation of a communication-level CDR is required in step 1010. If so, the reporting unit 148 generates and/or updates communication statistics in step 1012. After step 1010 or step 1012, the reporting unit 148 determines whether the current call is complete in step 1014. If not, the preferred method returns to step 1002.

Upon completion of the current call, the reporting unit 148 determines whether a call-level CDR should be generated, and, if so, generates and/or updates call statistics in steps 1016 and 1018, respectively. If call-level CDR generation is not required, or after step 1018, the reporting unit 148 generates each required CDR in step 1020, using the statistics maintained in the call statistic library 152. Preferably, each CDR comprises a data file in which the appropriate statistical information resides. After the CDRs have been generated, the reporting unit 148 directs their transfer to the reporting system 12.

While the present invention has been described with reference to certain preferred embodiments, those skilled in the art will recognize that various modifications can be provided. For example, speaker-dependent recognition could be employed to substitute a subscriber generated keyword with a corresponding string of digits. This and other variations upon the present invention are provided within the context of the embodiments described herein, which are limited only by the following claims.

What is claimed is:

1. A method of analyzing performance of a speech recognition system, the method comprising the steps of:
    a. selecting a speech parameter block, wherein the speech parameter block includes a data structure having a plurality of data fields, wherein the plurality of data fields includes a first data field for storing a plurality of logging parameters that control whether one or more speech communications between the speech recognition system and a user should be logged;
    b. transparently monitoring the one or more speech communications between the speech recognition system and the user via the plurality of logging parameters; and
    c. logging selective ones of the one or more speech communications as directed by the logging parameters, thereby forming a recorded speech communication to correspond with each of the one or more speech communications that is logged.

2. The method according to claim 1 wherein the plurality of logging parameters include:
    a. a plurality of logging conditions for indicating one or more conditions that control the step of logging, wherein the plurality of logging conditions include a plurality of general conditions, a plurality of intermediary conditions, and a plurality of specific conditions; and
    b. a plurality of sampling parameters for controlling a format of each recorded speech communication, wherein the plurality of sampling parameters include a first parameter for indicating a start of each recorded speech communication and a second parameter for indicating an end of each recorded speech communication.

3. The method according to claim 2 wherein the step of logging includes determining whether the plurality of general conditions require logging a current speech communication.

4. The method according to claim 3 wherein the step of logging further includes determining whether the plurality of intermediary conditions require logging the current speech communication.

5. The method according to claim 4 wherein the step of logging further includes determining whether the plurality of specific conditions require logging the current speech communication.

6. The method according to claim 1 wherein the step of logging includes storing each recorded speech communication in a first storage device while the user interacts with the speech recognition system.

7. The method according to claim 6 wherein the step of logging includes adding a first header to each recorded speech communication, wherein the first header includes a plurality of reference data.

8. The method according to claim 6 wherein the step of logging includes transferring each recorded speech communication to a second storage device after the user stops interacting with the speech recognition system.

9. The method according to claim 1 further including the step of providing a system statistics library for storing a plurality of operation data concerning operation of the speech recognition system.

10. The method according to claim 9 wherein the speech parameter block further includes a second data field for storing a plurality of reporting parameters that control whether the plurality of operation data should be updated.

11. The method according to claim 10 further including the step of updating the plurality of operation data as directed by the reporting parameters.

12. The method according to claim 10 further including the step of generating one or more performance records, each having a set of system performance statistics, wherein the step of generating is controlled by the plurality of reporting parameters.

13. The method according to claim 12 wherein the one or more performance records include a first detail level performance record, a second detail level performance record, a third detail level performance record, and a fourth detail level performance record, and wherein the plurality of reporting parameters determine which one of the one or more performance records is generated.

14. The method according to claim 12 further including the step of transferring the one or more performance records to a reporting system for facilitating system performance analysis.

15. A voice messaging system capable of recognizing one or more voice instructions from a user and capable of collecting system performance data, the voice messaging system comprising:
    a. a speech parameter block library having a plurality of speech parameter blocks for regulating collection of system performance data, wherein each speech parameter block includes a data structure having a plurality of data fields, wherein the plurality of data fields includes a first data field for storing a plurality of logging parameters that control whether one or more speech communications between the voice messaging system and the user should be logged;

b. means coupled to the speech parameter block library for selecting an appropriate one of the plurality of speech parameter blocks to control collection of system performance data;

c. means coupled to the speech parameter block library for transparently monitoring the one or more speech communications via the plurality of logging parameters of the appropriate one of the plurality of speech parameter blocks; and d. means coupled to the speech parameter block library for logging selective ones of the one or more speech communications as directed by the logging parameters, thereby forming a recorded speech communication to correspond with each of the one or more speech communications that is logged.

16. The voice messaging system according to claim 15 wherein the plurality of logging parameters include:

a. a plurality of logging conditions for indicating one or more conditions that control the means for logging, wherein the plurality of logging conditions include a plurality of general conditions, a plurality of intermediary conditions, and a plurality of specific conditions; and b. a plurality of sampling parameters for controlling a format of each recorded speech communication, wherein the plurality of sampling parameters include a first parameter for indicating a start of each recorded speech communication and a second parameter for indicating an end of each recorded speech communication.

17. The voice messaging system according to claim 16 wherein the means for logging determines whether the plurality of general conditions require logging a current speech communication.

18. The voice messaging system according to claim 17 wherein the means for logging determines whether the plurality of intermediary conditions require logging the current speech communication.

19. The voice messaging system according to claim 18 wherein the means for logging determines whether the plurality of specific conditions require logging the current speech communication.

20. The voice messaging system according to claim 15 further comprising a first storage device, wherein the means for logging stores each recorded speech communication in the first storage device while the user interacts with the voice messaging system.

21. The voice messaging system according to claim 20 wherein the means for logging adds a first header to each recorded speech communication that is stored in the first storage device, wherein the first header includes a plurality of reference data.

22. The voice messaging system according to claim 20 further comprising a second storage device, wherein the means for logging transfers each recorded speech communication to the second storage device after the user stops interacting with the voice messaging system.

23. The voice messaging system according to claim 15 further including a system statistics library for storing a plurality of operation data concerning operation of the voice messaging system.

24. The voice messaging system according to claim 23 wherein each speech parameter block further includes a second data field for storing a plurality of reporting parameters that control whether the plurality of operation data should be updated.

25. The voice messaging system according to claim 24 further including means for updating the plurality of operation data as directed by the reporting parameters.

26. The voice messaging system according to claim 24 wherein the means for updating generates one or more performance records according to the plurality of reporting parameters, each performance record having a set of system performance statistics.

27. The voice messaging system according to claim 26 wherein the one or more performance records include a first detail level performance record, a second detail level performance record, a third detail level performance record, and a fourth detail level performance record, and wherein the plurality of reporting parameters determine which one of the one or more performance records is generated.

28. The voice messaging system according to claim 26 further including a reporting system for facilitating system performance analysis, wherein the means for updating transfers the one or more performance records to the reporting system.

* * * * *